United States Patent [19]
Baratz et al.

[11] Patent Number: 5,742,596
[45] Date of Patent: Apr. 21, 1998

[54] NETWORK BASED DISTRIBUTED PBX SYSTEM

[75] Inventors: Yaron Baratz, Tel Aviv; Nachum Budin, Herzlia; Jacob Avimor, Tel Aviv, all of Israel

[73] Assignee: Phonet Communication Ltd., Herzelia, Israel

[21] Appl. No.: 572,444

[22] Filed: Dec. 14, 1995

[30] Foreign Application Priority Data

Nov. 12, 1995 [IL] Israel .......................................... 115967

[51] Int. Cl.⁶ .................................................. H04L 12/66
[52] U.S. Cl. .......................................................... 370/356
[58] Field of Search ............................... 370/351, 352, 370/353, 354, 355, 356, 461, 462, 463, 447, 455, 252

[56] References Cited

U.S. PATENT DOCUMENTS

| | | |
|---|---|---|
| 4,843,606 | 6/1989 | Bux et al. . |
| 4,886,704 | 12/1989 | Kamada et al. . |
| 5,341,374 | 8/1994 | Lewen et al. . |
| 5,428,608 | 6/1995 | Freeman et al. .................... 370/352 |
| 5,533,018 | 7/1996 | DeJager et al. ..................... 370/352 |
| 5,541,917 | 7/1996 | Farris ................................... 370/352 |
| 5,604,737 | 2/1997 | Iwami et al. ........................ 370/352 |

*Primary Examiner*—Douglas W. Olms
*Assistant Examiner*—Ajit Patel
*Attorney, Agent, or Firm*—Wilson Sonsini Goodrich & Rosati

[57] ABSTRACT

A network based distributed private branch exchange (PBX) system is described. Telephony clients communicate using regular telephone sets connected to telephony client modules installed in a host computer. Central office (CO) telephone lines terminate on telephony server modules installed in another host computer. A telephony server provides call switching functionality to the system. To transfer voice over the network, analog voice data is first digitized, packetized and then placed onto the network by the host computer. At the destination host computer, the packets are depacketized and converted back to analog voice. Packets generated from digitized voice data are no treated no differently on the network then regular non-voice traffic and are not given any special priority over non-voice traffic. The system includes client related features typically found in conventional PBX equipment such as call forwarding, conferencing, transfer, park, etc., in addition to server related features such administration, interactive voice response, voice mail, automatic call distribution, billing, etc. A remote subscriber interface module connects telephone sets that lack a host computer, to the network.

19 Claims, 6 Drawing Sheets

NETWORK BASED DISTRIBUTED PBX SYSTEM

FIELD OF THE INVENTION

The present invention relates to a network based distributed Private Branch Exchange (PBX) system.

BACKGROUND OF THE INVENTION

Traditional Private Branch Exchange (PBX) equipment sold today typically includes one or more telephone extensions attached to a centralized control unit. All telephone lines from a central office must terminate at the control unit. Although they have many advantages, PBXs have several disadvantages. One of these disadvantages is that the central control unit typically incorporates proprietary hardware and software which are generally expensive to maintain and upgrade. The telephone extensions themselves are usually manufactured by the PBX manufacturer, remain proprietary and are relatively expensive. In addition, separate cabling is required to connect each telephone extension to the central control unit.

Another disadvantage is the difficulty involved with keeping users and their assigned extension numbers synchronized. In many companies, frequent reorganization often means that employees must move from one office to another. It is usually desired that employees maintain their present extension numbers. Many PBX systems make this task difficult. The central control unit controls all the call processing within the system. This adds expense to the system while adding to the risk of failure of the entire system if the central unit goes down.

Most companies maintain two separate networks: a voice telephone network and a data network, typically a Local Area Network (LAN). Another disadvantage of traditional PBX equipment is that voice and data by default must be kept separate, with voice traffic on one set of cables and data traffic on another set. Many advantages exist to integrating the telephone and data networks together. Integration of voice and data has already been achieved in Integrated Services Digital Network (ISDN) lines and terminal equipment. ISDN uses circuit switching which is very wasteful of bandwidth. A dedicated channel is assigned during each call, however, very often, most of the bandwidth of this assigned channel goes unutilized.

Several advantages exists to integrating voice and data networks. An integrated voice and data network requires the installation and maintenance of only one infrastructure. In addition, an integrated network can provide more advanced functionality. An open system has the potential to provide a highly integrated voice/data network that is easily upgraded or reconfigured.

The integration of voice and data networks has been disclosed in the prior art. However, each suffers from various drawbacks. The systems described in U.S. Pat. Nos. 4,866,704 and 4,843,606 integrate a voice network onto a token ring data network. However, both inventions employ an external PBX unit to supply switching control functions. The system described in U.S. Pat. No. 5,341,374 integrates voice and data into a token ring network over a single cable. The system, however, assigns a higher priority to voice packets on the network than to data packets. Thus, the network distinguishes between voice packets and non-voice packets giving the former higher priority. This feature has the potential to adversely effect data traffic on the network.

SUMMARY OF THE INVENTION

It is an object of the present invention to provide an improved network based PBX system that integrates voice and data traffic within a single network infrastructure.

It is another object of the present invention to provide an integrated voice and data network wherein the voice traffic is given equal priority with non-voice traffic on the network.

Yet another object of the present invention is to provide PBX functionality distributed over a network without the need for traditional PBX hardware and associated cabling and at a much reduced cost when compared to traditional PBX equipment.

There is thus provided, in accordance with a preferred embodiment of the present invention, a private branch exchange system distributed across a packet based network which includes a plurality of telephony clients coupled to the network, at least one telephony server coupled to the network, the telephony server for providing call switching capabilities to the system, communications within the system realized through the transfer of packets over the network wherein the packets contain voice data, the packets containing voice data originating within the system having a priority equal to packets containing non-voice data on the network, and a system administrator coupled to the network, the system administrator for providing management and administration capabilities to the system. Further in accordance with a preferred embodiment of the present invention, each telephony client includes a regular telephone set coupled to a telephony client module installed in a host computer.

Also in accordance with a preferred embodiment of the present invention, the telephony server includes at least one telephony server module installed in a host computer, the telephony server module interfacing externally provided telephone lines.

In accordance with a preferred embodiment of the present invention, the system further includes a remote subscriber interface module for coupling regular telephone sets, that lack a host computer, to the network.

Also in accordance with a preferred embodiment of the present invention, the system includes a predetermined number of the plurality telephony clients grouped together to form a segment, a plurality of segments coupled together forming the network, a network routing device connects the plurality of segments to each other.

In accordance with a preferred embodiment of the present invention, there is provided a telephony client module, installed in a host computer, for interfacing a regular telephone set to a network based distributed private branch exchange, including a telephone set interface for providing a standard telephone interface between the regular telephone set and the telephony client module, a codec coupled to the telephone set interface, the codec for converting analog voice data from the telephone set interface into digital voice data, the codec for converting received digital voice data into analog voice data and outputting the converted analog voice data to the telephone set interface, a processor coupled to the codec, the processor for receiving the digital voice data output by the codec and forming packets of voice data therefrom, the packets of voice data having a priority equal to that of packets containing non-voice data on the network, and a host interface coupled to the telephone set interface and the processor, the host interface for controlling the telephone set interface and for sending the packets of voice data to the host computer.

Also in accordance with a preferred embodiment of the present invention, there is provided a telephony server module, installed in a host computer, for interfacing a plurality of external telephone lines, such as from a public switched telephone network, to a network based distributed private branch exchange, including a plurality of telephone network interfaces, each the telephone network interface coupled to one of the external telephone lines, the telephone network interface for interfacing the external telephone lines to the telephony server modules, a plurality of codecs, each codec coupled to one of the telephone network interfaces, the codec for converting analog voice data, output from the telephone network interface, into digital voice data, the codec for converting received digital voice data into analog voice data and outputting converted analog voice data to the telephone network interface, a processor coupled to the codec, the processor for receiving digital voice data output by the codec and forming packets of voice data therefrom, the packets of voice data having a priority equal with that of packets containing non-voice data on the network, and a host interface coupled to each telephone network interface and the processor, the host interface for controlling the plurality of telephone network interfaces and for sending the packets of voice data to the host computer.

Further in accordance with a preferred embodiment of the present invention, there is provided a method of communicating voice information across a network based distributed private branch exchange system from a source to a destination, including the steps of converting analog voice data received at the source into digital voice data, packetizing digital voice data into a plurality of voice packets, placing the plurality of voice packets onto the network wherein the voice packets have equal priority with non-voice packets on the network, depacketizing the plurality of voice packets received at the destination thereby regenerating the digital voice data, and converting the digital voice data back into analog voice data.

In accordance with a preferred embodiment of the present invention, there is provided a private branch exchange system distributed across a packet based network, including at least one regular telephone set, at least one telephony client module coupled to the regular telephone set and installed in a first host computer, the first host computer coupled to the network, at least one telephony server module coupled to at least one external telephone line and installed in a second host computer, the second host computer coupled to the network, a telephony server coupled to the network, the telephony server for providing call switching functionality to the system, and a telephone administrator coupled to the network, the system administrator for providing management and administration capabilities to the system.

BRIEF DESCRIPTION OF THE DRAWINGS

The invention is herein described, by way of example only, with reference to the accompanying drawings, wherein.

DETAILED DESCRIPTION OF THE INVENTION

Figure 1:
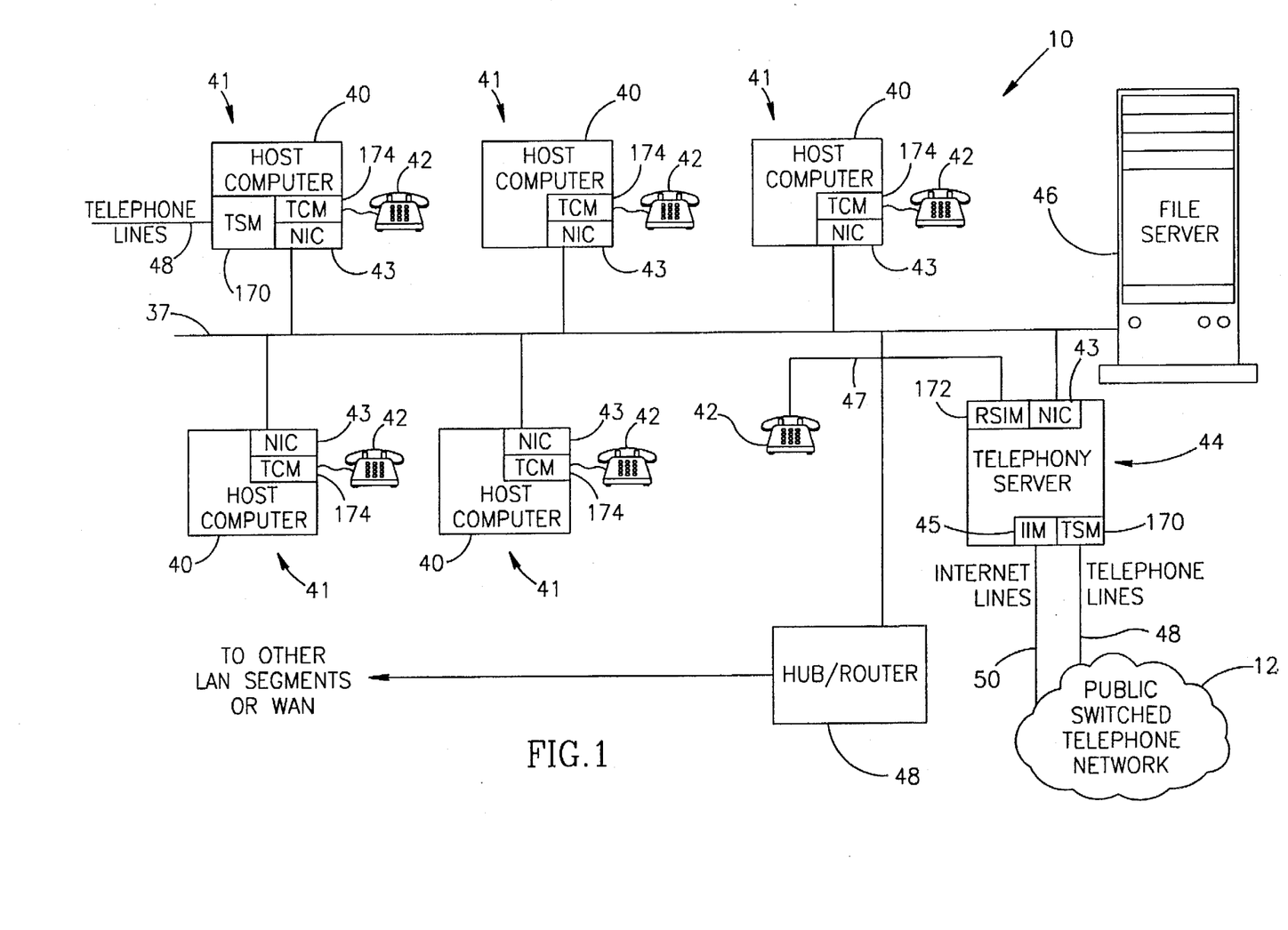
FIG. 1 is a high level logical block diagram illustrating the present invention applied to a sample telephony application integrating a PBX with a LAN.

A high level block diagram of a preferred embodiment of a network based distributed PBX system, generally referenced 10, is illustrated in FIG. 1. System 10 comprises one or more telephony servers 44 for managing all system control processes. On the network side, telephony server 44 is coupled to network 37 via network interface cards (NIC) 43 installed in a host computer 40. On the telephone network side, telephony server 44 is coupled to one or more central office (CO) lines 48 originating from a public switched telephone network (PSTN) 12 via one or more telephony server modules (TSM) 170. It is not required that telephony server module 170 reside in telephony server 44. Telephony server module 170 may reside in any host computer 40 attached to network 37. CO lines 48 may include Plain Old Telephone Service (POTS), T1, E1, Integrated Services Digital Network (ISDN), Asynchronous Transfer Mode (ATM) or Frame Relay. In addition, telephony server 44 is coupled to one or more internet lines 50 through an internet interface module (IIM) 45. Internet lines 50 may be connected to PSTN 12 or may be embodied as leased lines connected to an internet service provider. In either case, telephony server 44 is connected and has access to internet services. Telephony server 44 is also coupled to network 37 via NIC 43 installed in its host computer 40. Network 37 may alternatively be any suitable infrastructure providing network services for all attached devices or clients, such as a local area network (LAN) (e.g. Novell), wide area network (WAN), wireless LAN, Ethernet type network, Token Ring network, FDDI network, etc.

Attached to network 37 are one or more telephony clients 41. Each telephony client 41 is coupled to network 37 via NIC 43 installed in host computer 40. A regular telephone set 42 is coupled to telephony client 41 via a telephony client module (TCM) 174. Telephony client modules 174 include the hardware and software to support a connection to regular telephone set 42, a microphone and a speaker. In a preferred embodiment, host computer 40 is an ordinary personal computer (PC). Alternatively, host computer 40 may be any suitable hardware platform able to interface to the telephony client module or able to perform by itself the functionality of the telephony client module. Regular telephone sets 42 may be any ordinary telephone, preferably one that is able to generate dual tone multiple frequency (DTMF) tones.

Also attached to network 37, through a NIC (not shown) is a file server 46 which provides traditional file server or network server functionality to network 37. A hub or router 48 may also be connected to network 37 to provide a path to other remote LANs, WANs or to other LAN segments. It is common for very large networks with many nodes or clients to be constructed as multiple segments, wherein each segment includes a much smaller number of nodes. All the segments, however, are connected together using hubs and/ or routers. For example, a network of 100 nodes might be constructed as 10 segments with 10 nodes in each segment. A switching hub or router within each segment provides the connectivity to tie all the segments together. Traffic originating from one node within a segment to another node within the same segment never leaves the segment. This reduces unnecessary load on the rest of the network. Traffic destined for a node located outside the originating segment is routed through hub or router 48 toward the destination node.

In the operation of system 10, telephony server 44 provides centralized common management and all necessary resources for providing PBX switching control services. A key distinguishing feature of system 10 over traditional PBX equipment is that both voice and control information are transported over network 37 as ordinary LAN data packets. Traditional PBX systems include one or more central control units containing proprietary hardware and software. Every extension in the telephone network must be hardwired via a cable to the central control unit. In addition, each CO line from the telephone service utility must also be terminated at the central control unit. As mentioned previously, if a site also has a LAN to support their computer network, then two separate cabling and network systems must be maintained. System 10 eliminates having to maintain separate systems for voice and data by combining the two of them into one integrated system.

System 10 also supports regular telephone sets 42 that are not coupled to a host computer. In this case, referring to FIG. 1, telephone 42 is coupled directly to a remote subscriber interface module 172, installed in a host computer, via a traditional cable line 47, independent of network 37. Remote subscriber interface module 172 provides PBX services to telephones lacking a host computer and connects them to network 37. Depending on the type of LAN cabling installed, it might be possible to piggy back line 47 onto an unused pair within the LAN cabling. For example, when using 4 pair cable to wire an Ethernet LAN, two spare pairs are available. These spare pairs may be used to connect the telephone sets that are not connected to a host computer.

Telephony server modules and their associated software may be installed in any host computer attached to network 37. In addition, the host computer may be running other applications besides telephony server module applications. This is also the case with telephony clients. The host computer hosting the telephony client modules may run other applications besides telephony client applications. Both telephony servers and telephony clients transmit digitized voice and control data over network 37 as standard LAN data packets. For example, in the case of a Novell LAN, standard data packets are transmitted as IPX/SPX packets and follow a standard Novell protocol. System 10 operates within the standard LAN context using standard network protocols. No special protocols are utilized that give priority to system 10 generated voice or control data traffic. System 10 generated voice or control packets sent out over the LAN are treated no differently than and have equal priority with other non-voice data packets originating from other devices on network 37. Packets originating from system 10 are transferred over the LAN infrastructure without disturbing other network applications. Except for effecting available bandwidth on the network, it is completely transparent to network users.

Each telephony server provides connectivity for and controls a group of telephony clients. For larger networks, several telephony servers may be linked together to provide a larger scale system. The linked telephony servers would connect and control all telephony clients present in the system. The telephony server supervises all system control processes, such as switching functions, system related status generation, database management and system reporting functions.

During operation of system 10, internal calls made from one extension to another extension involve the telephony server only for the call setup, status monitoring and tear down of the call. The calling telephony client module digitizes and packetizes voice data received from its attached telephone set. It communicates these packets containing digitized voice data to the called extension over network 37. The calling extension correspondingly depacketizes the voice data received from the called extension and carries out digital to analog conversion of the digital data in order for the caller to hear the called party's voice.

For outgoing external calls, the calling extension communicates with the telephony server module, since telephone lines 48 from PSTN 12 terminate within the telephony server module. The calling party's voice is digitized, packetized and placed onto network 37 by the telephony client module. The voice packets are addressed to the appropriate telephony server module. Telephony server module depacketizes and converts the digital data into analog voice data for transmission onto telephone lines 48.

To support internal and external call capability, telephony server 44 maintains a database of user records. Each record holds relevant information such as extension number, user name, class of service, password, etc. Physical extensions are treated independently of logical extension numbers. The physical extension numbers are directly related to the unique network address of the host computer 40 that telephone set 42 is connected to. In a similar manner telephones connected to a remote subscriber interface module are assigned unique physical address. Logical extension numbers are assigned on a user basis. Each user is assigned a unique extension number. When a user logs into a host computer, for example, a telephony login process relates the user extension number to the network address of the host computer or the physical extension number. This allows users to freely login to any host computer and have it assigned their extension number automatically. To avoid possible problem situations, such as the same user logging in on two telephony clients, system 10 might limit user's privileges or available functionality upon login. The user extension number/network address pairs for each user logged into the system are maintained in a database in telephony server 44.

As previously-mentioned, system 10 provides telephony clients traditional PBX features. Such features are described below. Both the telephony server modules and telephony client modules generate several call progress signals such as: dial tone, ring back tone and busy tone. For internal calls, the ring back tone is generated by the calling or originating telephony client module. For external calls, the ring back tone is generated by the telephony server module associated with the particular PSTN CO line.

Another basic feature supplied by system 10 is call switching. For both internal and external calls, voice packets much arrive at their proper destination to effect communications. During the call setup phase of the call, network addresses (i.e. physical extensions) for both parties are retrieved from telephony server 44. The calling party is given the network address of the called party and vice versa. Once the parties have each other's network addresses, voice data packets begin to flow onto the LAN and communications between the parties proceeds.

Other standard PBX features supported by system 10 include operator services, night service, groups, distinguishing ring signals, follow me, call waiting, call forward, call, conference, call pick up, call park, call transfer, camping, do not disturb (i.e. incoming call block) and local answering machine services.

Figure 2:
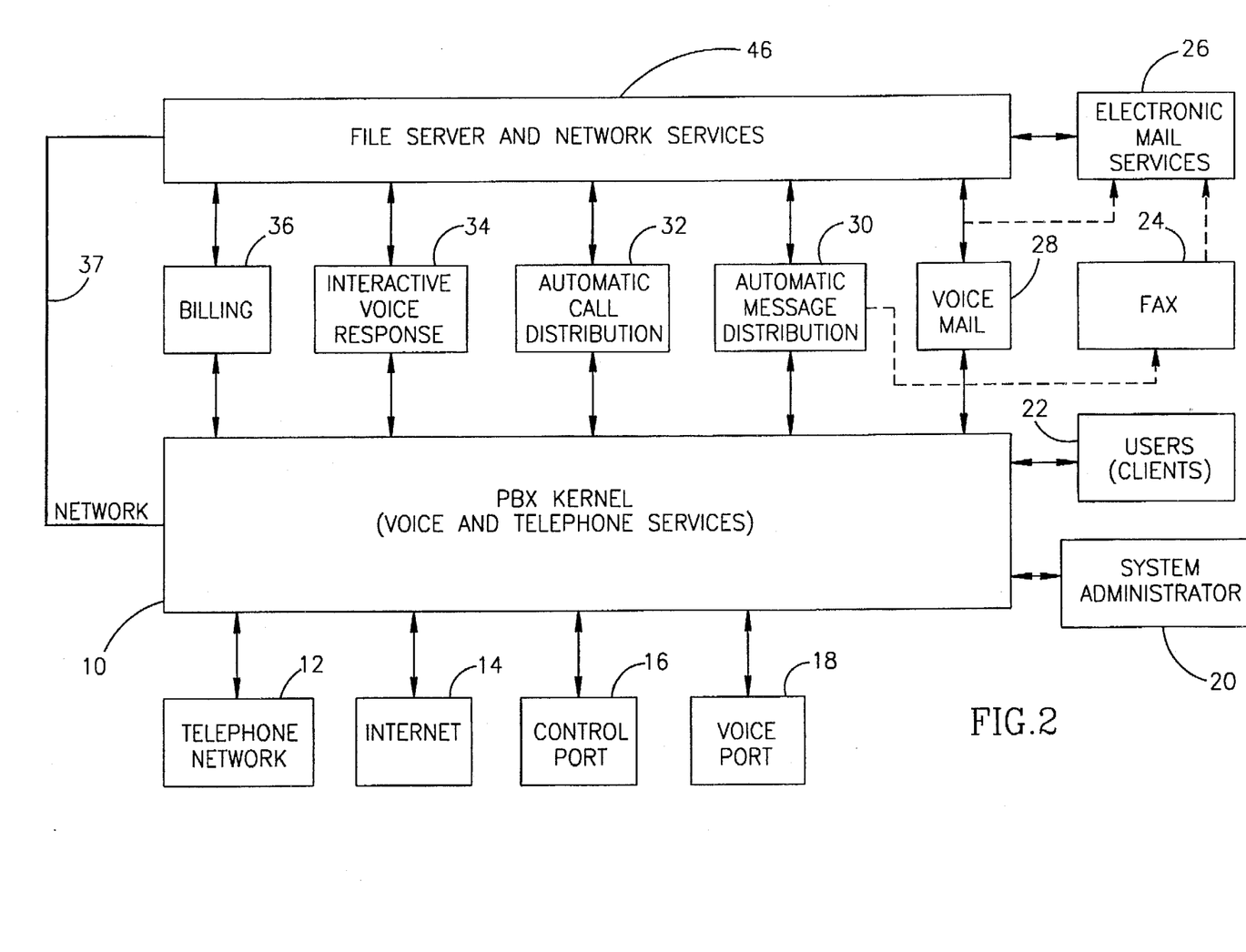
FIG. 2 is a high level functional block diagram illustrating a sample telephony application incorporating the present invention and associated telephony related services.

A preferred embodiment of system 10 as applied to a telephone system application is illustrated in FIG. 2. System 10 functions as the PBX kernel providing voice and telephone services to telephony clients. The PBX kernel may physically be implemented on one or more PCs. As mentioned previously, PBX kernel 10 includes one or more telephony server modules, one or more remote subscriber interface modules and associated software running on the host PC(s). The components/functions shown coupled to system 10 will now be described. The components/functions shown coupled to system 10 may be implemented on the same or different host computers. They do not necessarily have to be integral with the telephony server module but may be distributed throughout the network. They may even lie at remote locations, connected to system 10 via a WAN or other suitable means.

PSTN 12 is connected to system 10 to provide outside line capability to telephony clients. An Internet module 14 is coupled to system 10 to provide internet access to telephony clients. System 10 utilizes the voice capabilities of the internet and internet module 14 may be updated as new services and/or protocols are added to the internet. Control port 16 provides a general purpose physical connection and associated software for use by external devices or systems. Alternatively, control port 16 may be accessed through network 37. A voice port 18 includes a physical port and associated software for use by external devices or systems. Such applications include ATM, Frame Relay, other network transport or switching equipment or even an audio device such as a tape recorder, radio, etc. Alternatively, voice port 18 may be accessed through network 37.

System administrator 20, coupled to system 10, functions to provide configuration and administration features. Such features include user configuration of the system upon installation and subsequent hardware/software additions and/or deletions, maintaining a database of users, defining the class of service for each user, monitoring system status and generating reports.

Users 22 are the telephony clients connected to and supported by system 10. Users 22 include clients that are coupled to a host computer 40 (see FIG. 1) and clients that are connected directly to system 10 through a remote subscriber interface module.

A file server 46 provides traditional network and file services to system 10 in addition to all components that interface with system 10. System 10 and filer server 46 are communicate over network 37. Several components interface with both system 10 and file server 46. Each of these components or applications may exist on file server 46 or any PC that is coupled to network 37. It not necessary that any of these components reside and/or be run on any particular PC.

A billing system 36 provides traditional billing capability to system 10 for tracking telephone usage, call times, call costs, etc. An interactive voice response (IVR) system 34 routes incoming calls to the selected internal extension. Typical IVR systems play an out going message instructing the caller to press a sequence of digits in order to be connected to the party they are calling. After the user inputs his desired extension, telephony server 44 (see FIG. 1) causes a ring back tone to be generated toward the caller, letting him know the extensions status.

An automatic call distribution component 32 provides automatic call routing in accordance with one of the well known standards such as, automatic number identification (ANI) and calling line identification (CLI). Outside callers need not go through IVR system 34 to reach their party automatic call distribution component 32 utilizes call data transmitted from the CO to determine the called party's extension.

An automatic message distribution system 30 provides an outgoing based service wherein lists of either internal extensions or external telephone numbers may be dialed automatically. Upon successful call completion, a voiced message, prepared previously or generated in real time, may be delivered to the called party. In addition to voiced messages, automatic message distribution system, 30 may also deliver fax transmissions through fax component 24 or electronic mail messages through electronic mail services system 26. Fax component 24 is capable of handling both inbound and outbound fax traffic.

A voice mail system 28 provides callers the ability to leave voice messages when called parties are not available. Voice mail system 28 acts as a conventional answering machine for each telephony client on network 37. In a preferred embodiment, voice, fax and electronic mail services are integrated in that clients receive voice, fax and electronic mail messages within the same application on their workstations. The client's end user application treats fundamentally different types of messages similarly. Each type maybe read, deleted, replied to, etc. in the same manner.

Figure 3:
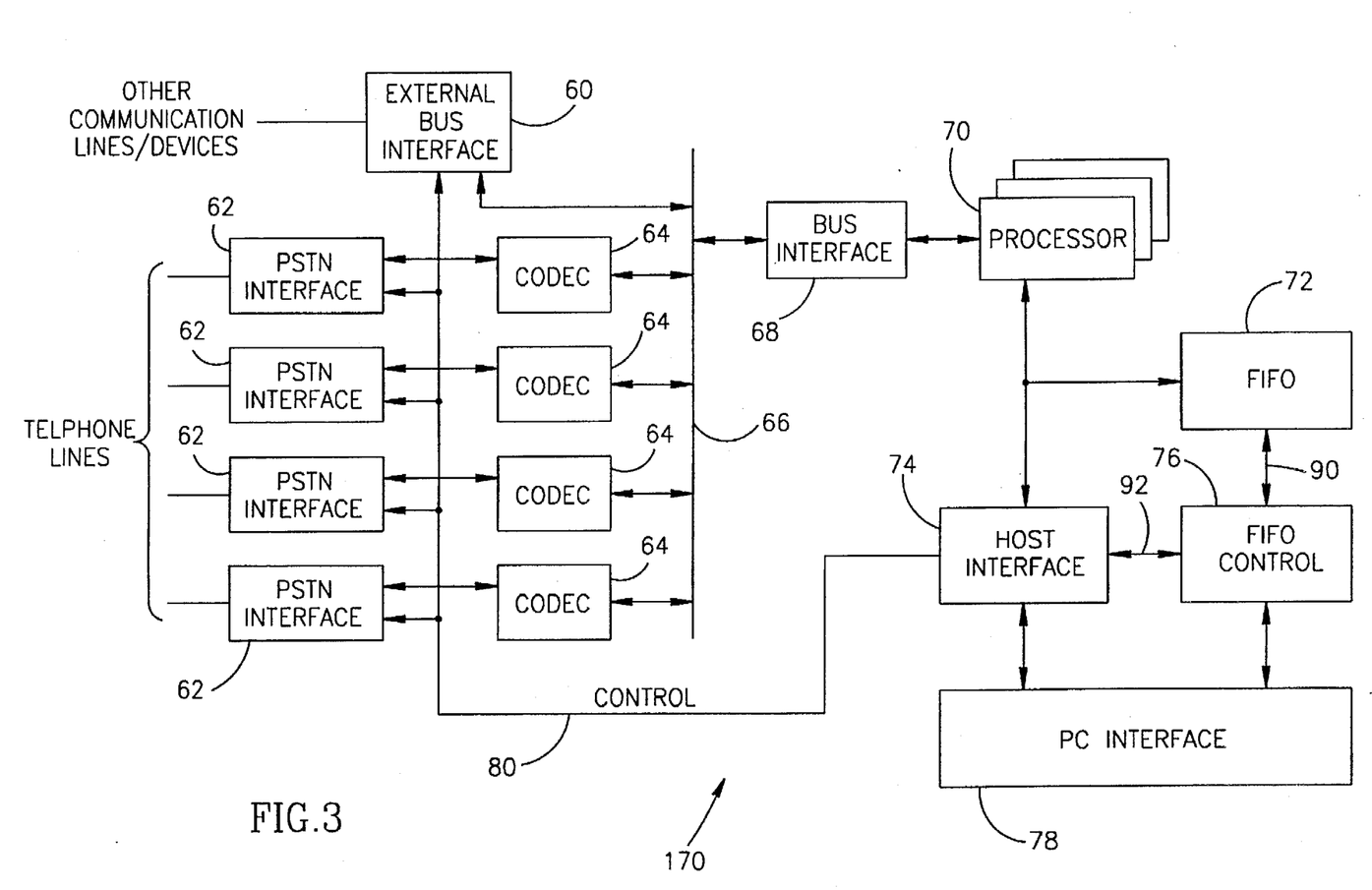
FIG. 3 is a high level block diagram of a preferred embodiment of the present invention illustrating the telephony server module.

A high level block diagram of a preferred embodiment of a telephony server module 170 is illustrated in FIG. 3. At the core of telephony server module 170 is a processor 70. Processor 70 may include one or more physical processors, such as, general purpose microprocessors, digital signal processors (DSPs), bit slice processors, etc. Functions performed by processor 70 include echo cancellation, tone detection and tone generation data transfer control, for example. Telephony server module 170 communicates with the host PC within which it resides through PC interface 78. PC interface 78 couples telephony server module 170 to the host PC and conforms to the appropriate bus standard employed by the host PC, such as Industry Standard Architecture (ISA), Extended ISA (EISA), S-BUS, Peripheral Control Interface (PCI), etc. A host interface 74 and FIFO control circuitry 76 are coupled to PC interface 78. Host interface 74 provides the interface between processor 70 and PC bus interface 78. FIFO control 76 reads data from and writes data to FIFO memory 72. Processor 70 is coupled to FIFO 72 and host interface 74.

Four PSTN interfaces 62 are shown coupling PSTN CO lines 48 to telephony server module 170. Although four interfaces are shown in FIG. 3, alternative embodiments may include more or less, depending on PCB space, cost, etc. As mentioned previously, telephony server module 170 may interface system 10 (see FIG. 1) to various different types of CO lines or services. PSTN interfaces 62 can be constructed to interface to, for example, POTS. An external bus interface circuit 60 interfaces other communication lines or devices to the telephony server module, such as, T1, El, ISDN, ATM or Frame Relay. The output from external bus interface 60 is a digital data stream. PSTN interfaces 62 and external bus interface 60 are controlled by host interface 74 through control line 80.

The signals output from PSTN interfaces 62 are input into coder/decoders (codec) 64. Codecs 64 convert the analog voice signals to digital voice data using well known standard techniques. Codecs 64 and external bus interface 60 place their digital voice data onto voice data bus 66. Since the output from external bus interface 60 is already in digital format, no codec is needed for analog to digital conversion. Bus interface 68 allows processor 70 to read from and write voice data to voice data bus 66. Processor 70 reads data from voice data bus 66, packetizes the voice data and places the voice packets into FIFO 72 to await transmission onto network 37 under control of FIFO control 76 and host interface 74.

Packets received by telephony server module 170 are depacketized by processor 70 and their contents undergo a digital to analog conversion by codecs 64. The analog voice signals are input to PSTN interfaces 62 for transmission to telephone lines 48.

Figure 4:
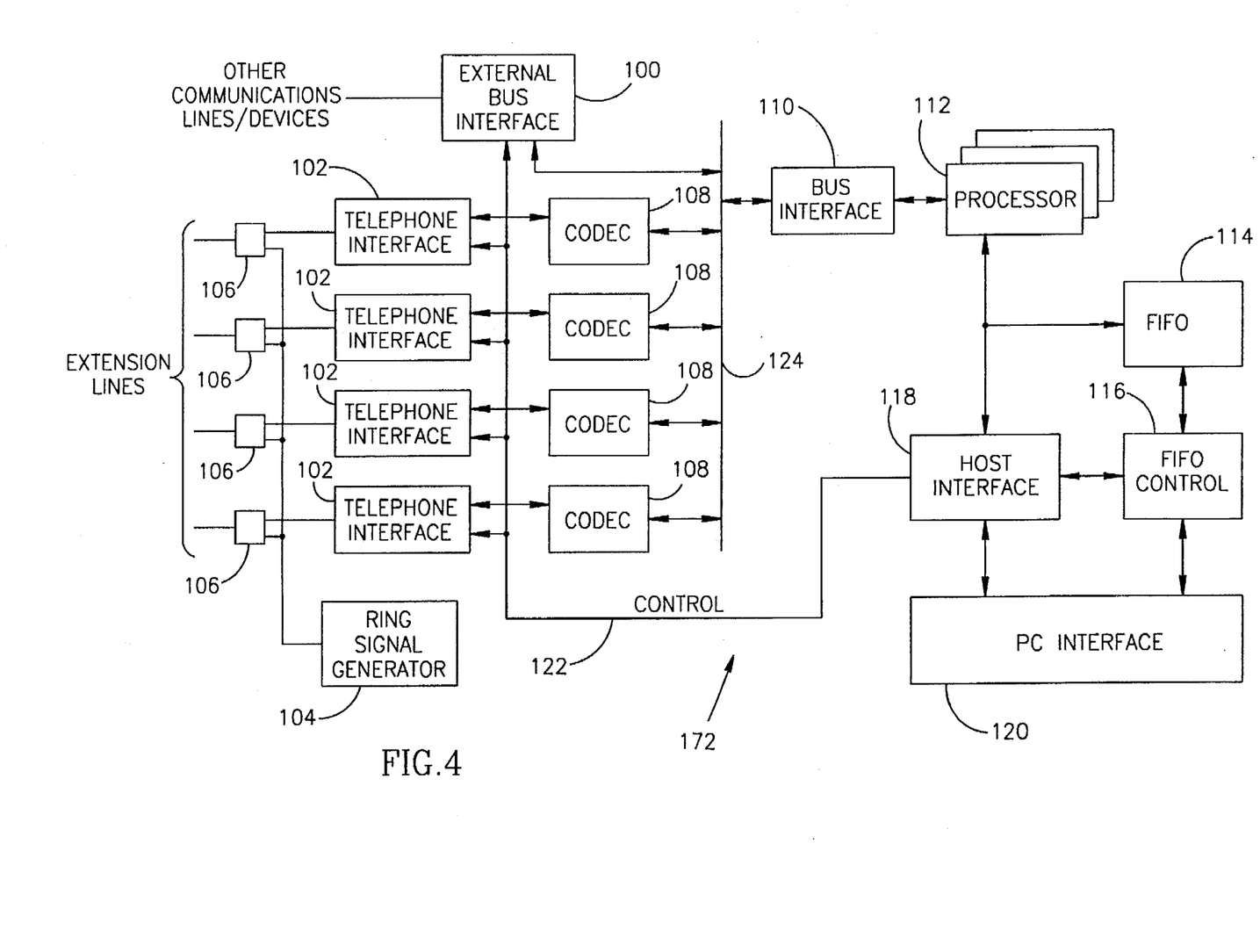
FIG. 4 is a high level block of a preferred embodiment of the present invention illustrating the remote subscriber interface module.

A high level block diagram of a preferred embodiment of a remote subscriber interface module 172 is illustrated in FIG. 4. Remote subscriber interface module 172 functions to provide telephony client functions for telephone sets 42 that are not coupled to a host computer (see FIG. 1). Remote subscriber interface module 172 may be hosted by any host computer, including the same host computer for telephony server module 170, or telephony server 44. In the example of remote subscriber interface module 172 illustrated in FIG. 4, up to four computerless telephone sets may be connected to remote subscriber interface module 172. The number of telephones accommodated may be higher or lower depending on such factors as PCB space, cost, etc.

Switches 106 interface a ring signal generator 104 to each extension line. Ringing signal generator 104 provides ringing tone for each connected telephone. Switch 102 may be an electromechanical switch, such as a relay, or a semiconductor switch, such as a MOSFET. The output of each switch 106 is input to a telephone interface 102. Telephone interfaces 102 couple codecs 108 to the extension lines. Telephone interfaces 102 and external bus interface 100 are controlled by host interface 118 through control signal 122. The operation of external bus interface 100, bus interface 110, FIFO 114, FIFO control 116, host interface 118, PC interface 120 and processor 112 within remote subscriber interface module 172 is similar to the operation of the corresponding elements within telephony server module 170, as described above. The main difference being that remote interface subscriber module 172 interfaces computerless extensions to system 10 rather than external telephone lines.

Similar in construction to telephony server module 170, analog voice from the extensions is digitized, packetized and placed onto network 37 (see FIG. 1) by the host PC. Packets received by the host PC pass through the reverse path, undergoing depacketization and a digital to analog conversion.

Figure 5:
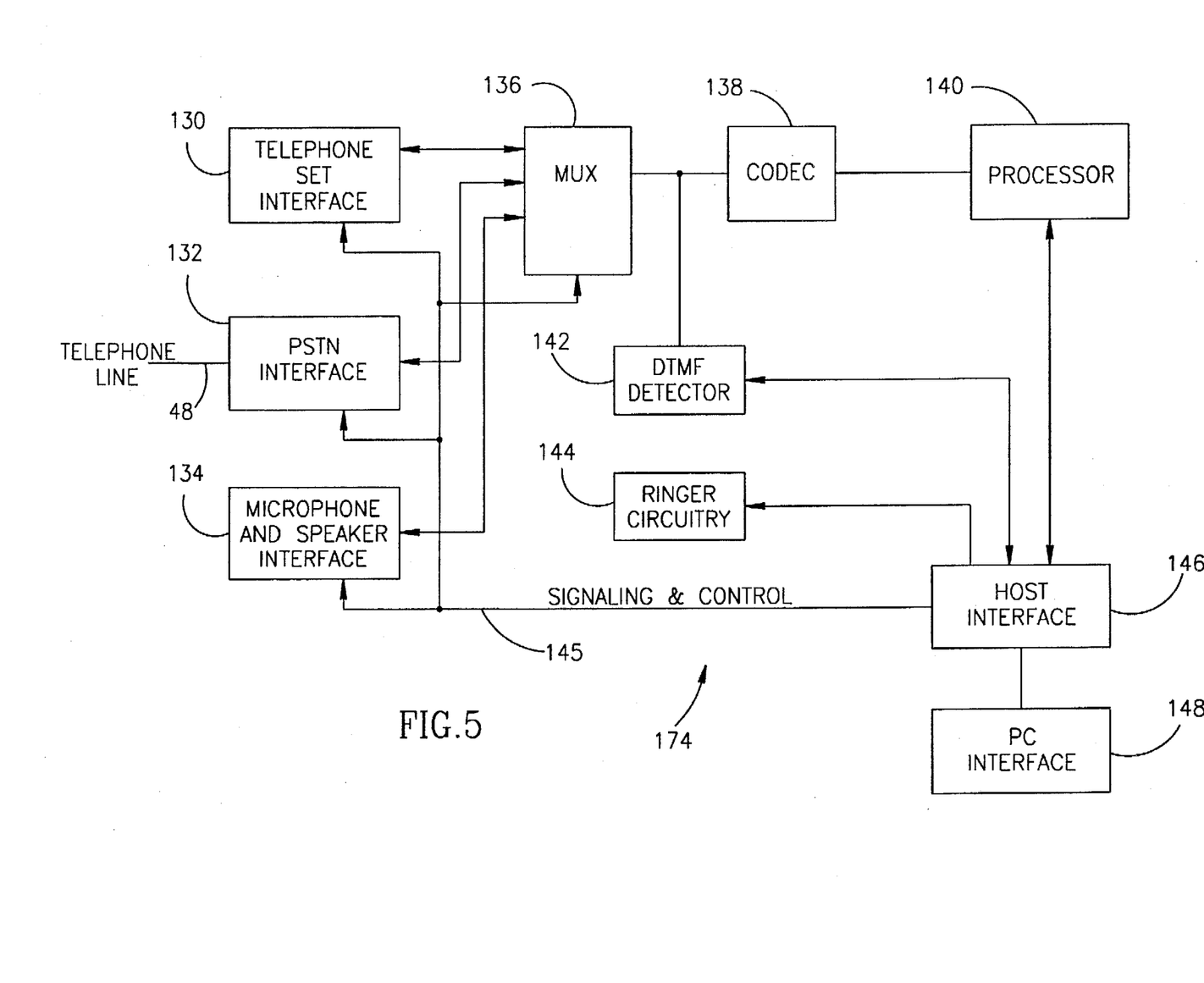
FIG. 5 is a high level block diagram of a preferred embodiment of the present invention illustrating the telephony client module.

A high level block diagram of a preferred embodiment of telephony client module 174 is illustrated in FIG. 5. Telephone set 42 (see FIG. 1) is connected to telephony client module 174 through telephone set interface 130. Alternatively, or in addition to telephone 42, a microphone and speaker may be connected to telephony client module 174 through microphone and speaker interface 143. Interface 134 allows an ordinary typical headset incorporating a microphone and speaker to be connected to telephony client module 174 for hands free telephone operation. PSTN interface 132 provides an input for a single telephone line 48. PSTN interface 132 is provided on the telephony client module as an alternate means of connecting system 10 to CO lines 48. PSTN interface 132 accommodates a distributed rather than a centralized CO incoming line arrangement. PSTN interface 132 is optional and need not be utilized by a user. A multiplexor (mux) 136 couples telephone set interface 130, PSTN interface 132 and microphone and speaker interface 143 to codec 138 and DTMF detector 142. Codec 138 converts analog data to and from digital data. The output of codec 138 is input to processor 140 where the data is processed and then packetized for ultimate placement onto network 37 by the host PC. Voice packets are passed to the host through host interface 146 and PC interface 148. Host interface 146 controls interfaces 130, 132, 134 and mux 136 through signalling and control lines 145.

DTMF detector 142 functions to detect DTMF tones present on the incoming line. DTMF tones may be generated by a user through telephone 42 or by a caller. Ringer circuitry 144 generates ringing tone for use in the operation by the telephony client module. As mentioned earlier, the telephony client module generates a variety of different ringing signals for purposes such as distinctive ringing, etc.

Figure 6:
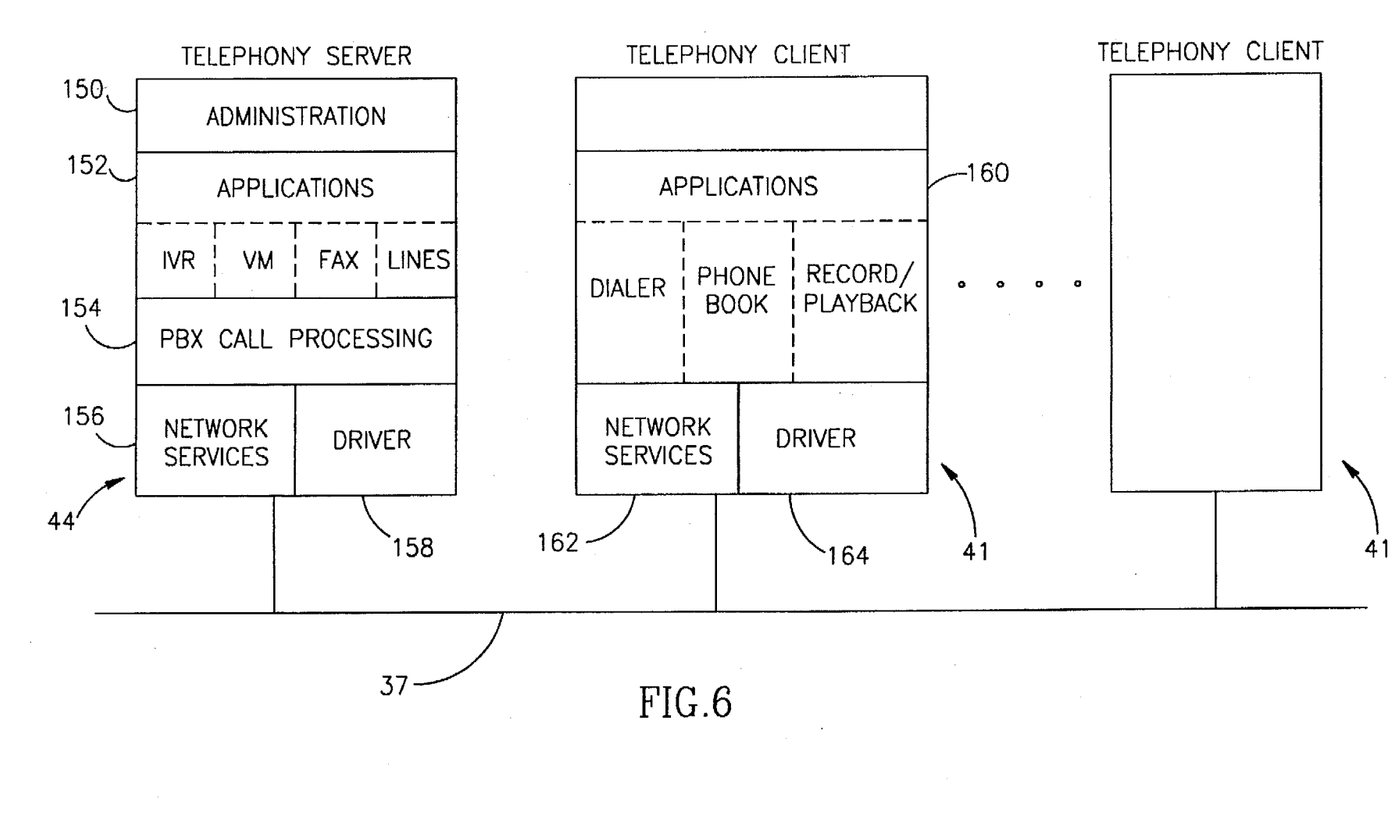
FIG. 6 is a high level software architecture diagram illustrating both the telephony server module and telephony client module.

Shown in FIG. 6 are the software architectures for telephony server 44 (hosting a telephony server module) and telephony clients 41. The architectures are shown with the lowest level components on the bottom and the highest level components on top. Telephony server 44 includes low level modules network driver 156 and server card driver 158. Network services driver 156 provides the required protocol stack to effect communications between the host PC and network 37 and between the host PC and the remote subscriber interface module, if it is installed. Driver 158 interfaces host PC based telephony server software to the hardware and software on the telephony server and remote subscriber interface module. One level up, is a PBX call processing module which functions to control all call processes within telephone server 44. Functions include the standard PBX capabilities described above. The next layer is application layer 152. This software layer includes all the applications described with reference to FIG. 2, such as IVR, voice mail and faxing. A lines application manages CO lines 48 (see FIG. 1). An administration layer 150 resides at the highest level. This layer provides a suite of administrative features and functions that can typically be found in conventional PBX equipment. Since the administration functions are implemented in software, network 37 may be managed from anywhere, from within network 37 or from a remote site connected to network 37.

The software architecture for telephony clients 41 also includes a network services driver 162 for connecting the host PC to network 37. Driver 164 allows telephony client host based software to communicate with the telephony client module installed within its host computer. At the next level is applications layer 160. Applications on telephony client 41 include a dialer, phone book and record/playback applications, for example. The dialer functions to dial digits of numbers entered directly by the user or chosen from numbers listed in a computerized phone book. A record/ playback application provides record and playback functions for use with voice mail and other applications.

While the invention has been described with respect to a limited number of embodiments, it will be appreciated that many variations, modifications and other applications of the invention may be made.

What is claimed is:

1. A personal computer based private branch exchange system distributed across a packet based network, comprising:

a plurality of telephony clients coupled to said network, each telephone client coupled to said network via a network interface card and adapted to interface to a standard analog telephone set;

at least one telephony server coupled to said network, said telephony server for providing centralized call switching capabilities to said plurality telephony clients, communications within said system realized through the transfer of packets over said network wherein said packets contain voice data, said packets containing voice data originating within said system having a priority equal to packets containing non-voice data on said network, said at least one telephony server operative to provide call setup, status monitoring and tear down functions for calls placed by said plurality of telephony clients; and a system administrator coupled to said network said system administrator for providing management and administration capabilities to said system.

2. The system according to claim 1, wherein each said at least one telephony server comprises at least one telephony server module installed in a host computer, said telephony server module interfacing telephone lines provided from a telephone central office to said system.

3. The system according to claim 1, further comprising a remote subscriber interface module for coupling regular a telephone sets to said network without requiring analog personal computer host for operation of said remote subscriber interface module.

4. The system according to claim 1, wherein a predetermined number of said plurality of telephony clients are grouped together to form a segment, a plurality of segments coupled together to form said network, a network routing device for connecting said plurality of segments to each other.

5. The system according to claim 1, further comprising a telephony client module adapted to be installed in a host computer, said telephony client module for interfacing a regular analog telephone set to said system, said telephone client module comprising:

an analog telephone set interface for providing a standard analog telephone interface between said regular analog telephone set and said telephony client module;

a codec coupled to said analog telephone set interface, said codec for converting analog voice data from said analog telephone set interface into digital voice data, said codec for converting received digital voice data into analog voice data and outputting said converted analog voice data to said analog telephone set interface;

a processor coupled to said codec, said processor for receiving said digital voice data output by said codec and forming packets of voice data therefrom, said packets of voice data having a priority equal to that of packets containing non-voice data on said network; and a host interface coupled to said analog telephone set interface and said processor, said host interface for controlling said analog telephone set interface and for sending and receiving said packets of voice data to and from said host compute.

6. The telephony client module according to claim 5, further comprising an interface for coupling an external telephone line to said telephony client module.

7. The telephony client module according to claim 5, further comprising an interface for coupling a microphone and speaker to said telephony client module.

8. The system according to claim 1, further comprising a telephony server module adapted to be installed in a host computer, said telephony server module for interfacing a plurality of external telephone lines, such as from a public switched telephone network, to a network based distributed private branch exchange, said telephony server module comprising:

a plurality of telephone network interfaces, each said telephone network interface coupled to one of said external telephone lines, said telephone network interface for interfacing said external telephone lines to said telephony server module;

a processor for receiving voice data output by said plurality of telephone network interface and forming packets of voice data therefrom, said packets of voice data having a priority equal with that of packets containing non-voice data on said network; and a host interface coupled to each of said telephone network interfaces and said processor, said host interface for controlling said plurality of telephone network interfaces and for sending said packets of voice data to said host computer.

9. The telephony server module according to claim 8, further comprising an external bus interface for coupling an external communication device to said telephony server module.

10. The system according to claim 8, further comprising a plurality of codecs, each codec coupled to one of said telephone network interfaces, each codec for converting analog voice data, output from said telephone network interface, into digital voice data, each codec for converting received digital voice data into analog voice data and outputting said converted analog voice data to said telephone network interface.

11. The system according to claim 1, further comprising billing means for tracking telephone call related data.

12. The system according to claim 11, wherein the billing means tracks telephone call related data selected from the group consisting of telephone usage, call times and call costs.

13. The system according to claim 1, further comprising interactive voice means for routing incoming calls to internal extensions in response to user replies to automated outgoing messages from said system.

14. The system according to claim 1, further comprising automatic call distribution means for routing an incoming call in accordance with call related data transmitted by the central office.

15. The system according to claim 1, further comprising automatic message distribution means for automatically dialing telephone numbers within one or more lists stored therein.

16. The system according to claim 1, further comprising voice mail means operative to permit callers to leave voice messages when called parties are not available, said voice mail means providing answering machine services to said plurality of telephone clients.

17. A method of communicating voice information across a network based distributed private branch exchange system from a source to a destination for the duration of a call, comprising the steps of:

converting analog voice data received at said source into digital voice data;

packetizing said digital voice data into a plurality of voice packets;

placing said plurality of voice packets onto said network wherein said voice packets have equal priority with non-voice packet on said network;

depacketizing said plurality of voice packets received at said destination;

converting said digital voice dam back into said analog voice data; and providing centralized call management for effecting call setup status monitoring and tear down of calls between the source and the destination.

18. A personal computer based private branch exchange system distributed across a packet based network, comprising:

a plurality of telephony clients coupled to said network, each telephone client coupled to said network via a network interface card and adapted to interface to a standard analog telephone set;

at least one telephony server module coupled to at least one external telephone line provided from a central office and installed in a second host computer, said second host computer coupled to said network;

at least one telephony server coupled to said network, said telephony server for providing centralized call switching capabilities to add plurality of telephony clients, communications within said system realized through the transfer of packets over said network wherein said packets contain voice data, said packets containing voice data originating within said system having a priority equal to packets containing non-voice data on said network, said at least one telephony server operative to provide call setup, status monitoring and tear down functions for calls placed by said plurality of telephony clients; and a telephone administrator coupled to said network, said system administrator for providing management and administration capabilities to said system.

19. The system according to claim 18, further comprising a remote subscriber interface module for coupling a standard analog telephone set to said network without requiring a personal computer host for operation of said remote subscriber interface module.

* * * * *